Nov. 11, 1924.
G. S. CARR
1,514,654
COUPLING DEVICE FOR DOG COLLARS AND OTHER USES
Filed Nov. 21, 1922
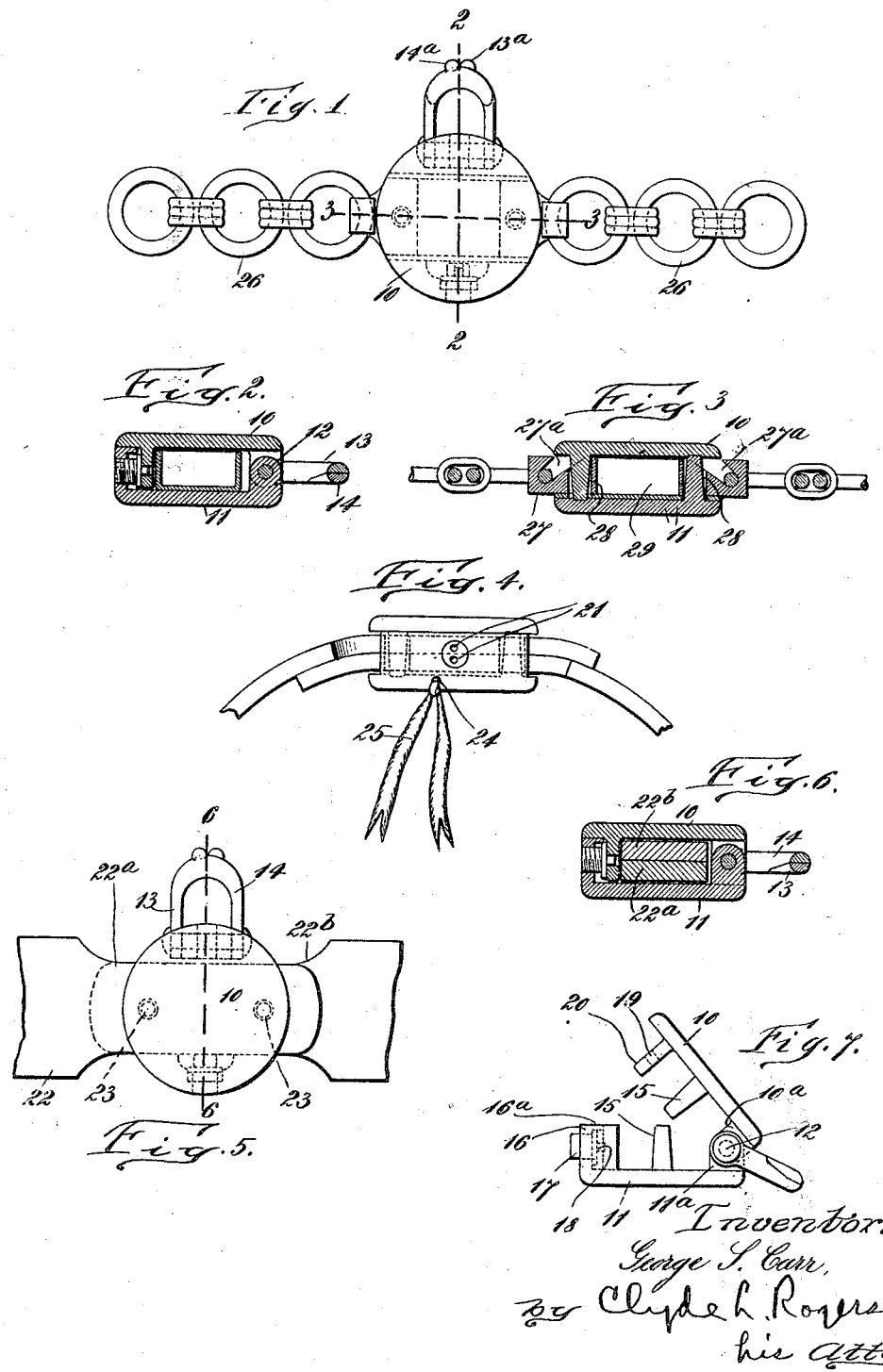

Patented Nov. 11, 1924.

1,514,654

UNITED STATES PATENT OFFICE.

GEORGE S. CARR, OF BOSTON, MASSACHUSETTS.

COUPLING DEVICE FOR DOG COLLARS AND OTHER USES.

Application filed November 21, 1922. Serial No. 602,358.

*To all whom it may concern:*

Be it known that I, GEORGE S. CARR, a citizen of the United States, and resident of Boston, county of Suffolk, Commonwealth of Massachusetts, have invented an Improvement in Coupling Devices for Dog Collars and Other Uses, of which the following description, in connection with the accompanying drawings, is a specification, like characters on the drawings representing like parts in each of the several views.

This invention relates to coupling devices specially adapted and designed for dog collars, though adaptable also for harness and various sporting goods uses. A principal object of the invention is to provide a coupling device that is attractive and ornamental in appearance and also strong and durable in use and capable of being quickly and easily attached and detached. A further object is to provide a coupling device providing a secret secure lock with an improved twin leash hook and also if desired with provision for attachment of a ribbon and having also if desired provision for a secret chamber which is adapted to hold secure any desired data. My improved coupling device also has its opposite sides adapted to serve each as a name plate, the device being reversible so that either of such name plates may be exposed to view at will. The foregoing and other objects and advantages of the invention will more fully appear from the following detailed description taken in connection with the accompanying drawings, and the distinctive features of novelty will be pointed out in the appended claims.

Referring to the drawings:

Fig. 1 is a plan view showing one embodiment of my invention with a dog collar chain engaged therewith;

Fig. 2 is a transverse section on line 2—2 of Fig. 1;

Fig. 3 is a section on line 3—3 of Fig. 1;

Fig. 4 is a side view showing the application of my invention for securing the ends of a collar;

Fig. 5 is a plan view of the device as applied in Fig. 4;

Fig. 6 is a transverse section on line 6—6 of Fig. 5; and

Fig. 7 is an end view of the securing device opened.

My improved securing device as illustrated in Figures 4–7 comprises two plates 10, 11 which may be circular in form and with the outer surfaces thereof finished to constitute name plates. These plates are equipped with ears $10^a$, $11^a$ respectively at one side thereof and these ears are perforated to receive a pivot pin 12. This pivot pin also has engaged with projecting end portions thereof twin leash hooks 13, 14 which have their outer portions curved and extending in mating overlapping relation as best seen in Figures 1 and 2. These leash hook members may be equipped with small projections $13^a$, $14^a$ whereby they may be swung apart to receive a leash ring. With this construction it will be noted that with the leash ring thus inserted, as these hook members are pressed together in mating relation, the ring is held secure against removal. Each of the plates 10, 11 is provided with a stud 15 projecting inward therefrom, these studs being, as herein illustratively shown, located adjacent opposite sides of the respective plates and each stud projecting toward the opposite plate and substantially into engagement therewith when the plates are closed together. One of the plates, i. e., as shown the plate 11 is provided opposite the pivot 12 with a boss or ledge 16 of substantial angular extent and providing a face $16^a$ against which the other plate 10 is adapted to engage when the plates are closed and in parallelism. The boss 16 is also equipped with a suitable locking member shown as a stud 17 threaded therein. This stud has a reduced pin projection 18 extending inwardly therefrom and this pin projection is adapted to engage an aperture 19 in a tongue 20 projecting inward from the other plate member 10, when the plates are closed and the screw stud 17 is adjusted inward. For thus turning the screw stud 17 it may be provided with spaced apart holes 21 in its outer end, which may be engaged by a suitable spanner device. The securing device thus constituted is adapted to receive end portions $22^a$, $22^b$ of a leather or other collar 22, these collar extremities being reduced in width when necessary to be received into the securing device. These collar extremities are disposed in overlapping relation in the securing device and they are provided with holes 23 to receive the respective studs 15. Thus with these collar ends engaged with studs 15 and the plates 10, 11 closed and locked together in the manner described, the collar is held secure, and can only be removed by the use of a spanner device which is made to fit the holes 21. The securing device may also be provided with an opening 24 adapted to receive a ribbon or like ornament 25. In Figures 1, 2 and 3, I show the securing device equipped with provision to hold the ends of a collar chain 26. In this case I provide a bar 27 adapted to be fitted in the securing device and having sockets 27ª in its projecting ends adapted to receive the end rings of the chain. When the plate members are closed together these sockets are closed by the peripheral portion of the plate 10 as shown in Figure 3, so that the chain is prevented from disengagement except when the securing device is opened. The bar 27 is provided with spaced apart apertures 28 therethrough adapted to receive the studs 15 to hold the bar assembled with the securing device. The intermediate portion of this bar may also be recessed as indicated at 29 to provide a chamber for the reception of any desired data or indicia and when the securing device is locked, this compartment thus constitutes a secret chamber to which access may only be had when the securing device is unlocked. The bar 27 which thus constitutes a connecting device for the two ends of the chain, may be either produced in one piece, or it may be made up of two end heads secured to an intermediate portion as herein shown. The device thus constituted is compact, light in weight and attractive in appearance, while at the same time being strong and reliable in use. It is adapted to secure the ends of collars of a considerable range of widths by merely reducing the width of the ends of the collar, so that it will fit into the recess provided between the two plates. I preferably produce the plates 10, 11 of a special aluminum alloy, which may be buffed and finished so as to provide attractive name plates at the two sides of the device. Should it be desired to change the data on the name plates they can be quickly and easily buffed off so as to receive other addresses. A further feature of advantage is that my improved coupling device has no parts liable to rattle, and none that can possibly become disengaged except by the intentional unlocking of the part. I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. A coupling device of the kind described, comprising two plates pivoted together at one side thereof, and each adapted to provide a name plate on its outer surface, a two-part leash hook engaged with the pivot of said plates, the two parts of said hook overlapping in mating relation with a capability of separation to receive a ring, said two plates equipped with studs extending inwardly therefrom to engage holes in portions of a collar or the like, one of said plates equipped with a stud adapted to be adjusted for locking purposes, and the other plate having a tongue projecting inward therefrom equipped with an aperture, adapted to receive a projection from said stud to hold the plates locked together.

2. A coupling device of the kind described, comprising two plates pivoted together at one side thereof, a two-part leash hook engaged with the pivot of said plates, the two parts thereof overlapping in mating relation, studs projecting inwardly from each of said plates substantially to the other plate, and a bar having apertures to receive said studs with the extremities thereof projecting and equipped with sockets to receive the ends of a chain.

3. A coupling device of the kind described, comprising two plates pivoted together at one side thereof, a two-part leash hook engaged with the pivot of said plates, the two parts thereof overlapping in mating relation, studs projecting inwardly from each of said plates substantially to the other plate, and a bar having apertures to receive said studs with the extremities thereof projecting and equipped with sockets to receive the ends of a chain, said bar having a recess intermediate the length thereof to constitute a secret compartment.

In testimony whereof, I have signed my name to this specification.

GEORGE S. CARR.